(12) United States Patent
Wang et al.

(10) Patent No.: US 10,845,033 B2
(45) Date of Patent: Nov. 24, 2020

(54) WHITE LIGHT ILLUMINATION SYSTEM

(71) Applicant: Taiwan color optics, Inc., Taichung (TW)

(72) Inventors: Chih-Feng Wang, Taichung (TW); Yung-Peng Chang, Kaohsiung (TW); Hsin-An Chen, Changhua County (TW); Shih-Hsin Chang, Taipei (TW)

(73) Assignee: TAIWAN COLOR OPTICS, INC., Taichung (TW)

( * ) Notice: Subject to any disclaimer, the term of this patent is extended or adjusted under 35 U.S.C. 154(b) by 0 days.

(21) Appl. No.: 16/797,532

(22) Filed: Feb. 21, 2020

(65) Prior Publication Data
US 2020/0271303 A1   Aug. 27, 2020

(30) Foreign Application Priority Data
Feb. 25, 2019  (TW) .............................. 108106315 A

(51) Int. Cl.
*F21V 13/14* (2006.01)
*F21V 9/30* (2018.01)
*F21V 7/00* (2006.01)
*F21V 5/00* (2018.01)
*F21V 29/76* (2015.01)

(52) U.S. Cl.
CPC ............... *F21V 13/14* (2013.01); *F21V 5/00* (2013.01); *F21V 7/0025* (2013.01); *F21V 9/30* (2018.02); *F21V 29/76* (2015.01)

(58) Field of Classification Search
CPC . F21V 13/14; F21V 29/76; F21V 9/30; F21V 7/0025; F21V 5/00
See application file for complete search history.

(56) References Cited

U.S. PATENT DOCUMENTS

| | | | |
|---|---|---|---|
| 2017/0092786 A1* | 3/2017 | Newell | H01L 31/18 |
| 2017/0284633 A1* | 10/2017 | Chiu | C03C 4/12 |
| 2017/0350562 A1* | 12/2017 | Khrushchev | G02B 27/141 |
| 2018/0348423 A1* | 12/2018 | Vasylyev | G02B 6/0038 |
| 2019/0264100 A1* | 8/2019 | Cozzan | C04B 35/44 |

* cited by examiner

*Primary Examiner* — Evan P Dzierzynski
(74) *Attorney, Agent, or Firm* — Li & Cai Intellectual Property (USA) Office

(57) ABSTRACT

A white light illumination system is provided, including a light source unit, a beam splitter unit, a phosphor unit, a heat dissipation unit, and a diffuse reflective unit. The light source generating unit can generate an approximately collimated light beam along a predetermined transmission path. The beam splitter unit, the phosphor unit, and the diffuse reflective unit are disposed adjacent to one side of the light source unit. The beam splitter unit is located on the predetermined transmission path. The approximately collimated light beam is projected onto the beam splitter unit. The heat dissipation unit is disposed on the phosphor unit.

9 Claims, 3 Drawing Sheets

WHITE LIGHT ILLUMINATION SYSTEM

CROSS-REFERENCE TO RELATED PATENT APPLICATION

This application claims the benefit of priority to Taiwan Patent Application No. 108106315, filed on Feb. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an illumination system, and in particular, to a white light illumination system that can generate a white light source.

BACKGROUND OF THE DISCLOSURE

Firstly, in conventional projectors in the existing technology, to generate a white light source, a laser generated by a light source module is directly irradiated on a phosphor. A part of the laser excites the phosphor, and another part of the laser penetrates the phosphor and is projected out. However, in the modes of such architecture, when power of the light source module is excessively high, it may cause the phosphor to be damaged due to long-term exposure to high temperature.

In addition, in the existing technology described above, in order to adjust color temperature, it is usually necessary to additionally provide a blue light beam to be mixed with a white light beam. Therefore, the cost is increased correspondingly.

SUMMARY OF THE DISCLOSURE

The technical problem to be solved by the present disclosure is to provide a white light illumination system in response to the inadequacies of the existing technology.

In one aspect, a white light illumination system is provided, including a light source unit, a beam splitter unit, a phosphor unit, a heat dissipation unit, and a diffuse reflective unit. The light source generating unit can generate an approximately collimated light beam along a predetermined transmission path. The beam splitter unit is disposed adjacent to one side of the light source unit, and the beam splitter unit is located on the predetermined transmission path, where the approximately collimated light beam can be projected to the beam splitter unit. The phosphor unit is disposed adjacent to one side of the light source unit. The phosphor unit further includes a phosphor and a reflector disposed on the phosphor. The heat dissipation unit is disposed on the phosphor unit, and the reflector is disposed between the heat dissipation unit and the phosphor. The diffuse reflective unit is disposed adjacent to one side of the light source unit. The approximately collimated light beam can be split by the beam splitter unit, to form first approximately collimated light and second approximately collimated light that are projected to the phosphor unit and the diffuse reflective unit, respectively. The first approximately collimated light and the second approximately collimated light are projected to the beam splitter unit after being reflected by the phosphor unit and the diffuse reflective unit, respectively, to form a combined white light beam.

One of the beneficial effects of the present disclosure is that, the white light illumination system provided by the embodiment of the present disclosure can be applied to high-power light source module architecture by the technical solutions of "the approximately collimated light beam can be split by the beam splitter unit, to form first approximately collimated light and second approximately collimated light that can be projected to the phosphor unit and the diffuse reflective unit, respectively" and that "the first approximately collimated light and the second approximately collimated light are projected to the beam splitter unit after being reflected by the phosphor unit and the diffuse reflective unit respectively, to form a combined white light beam".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
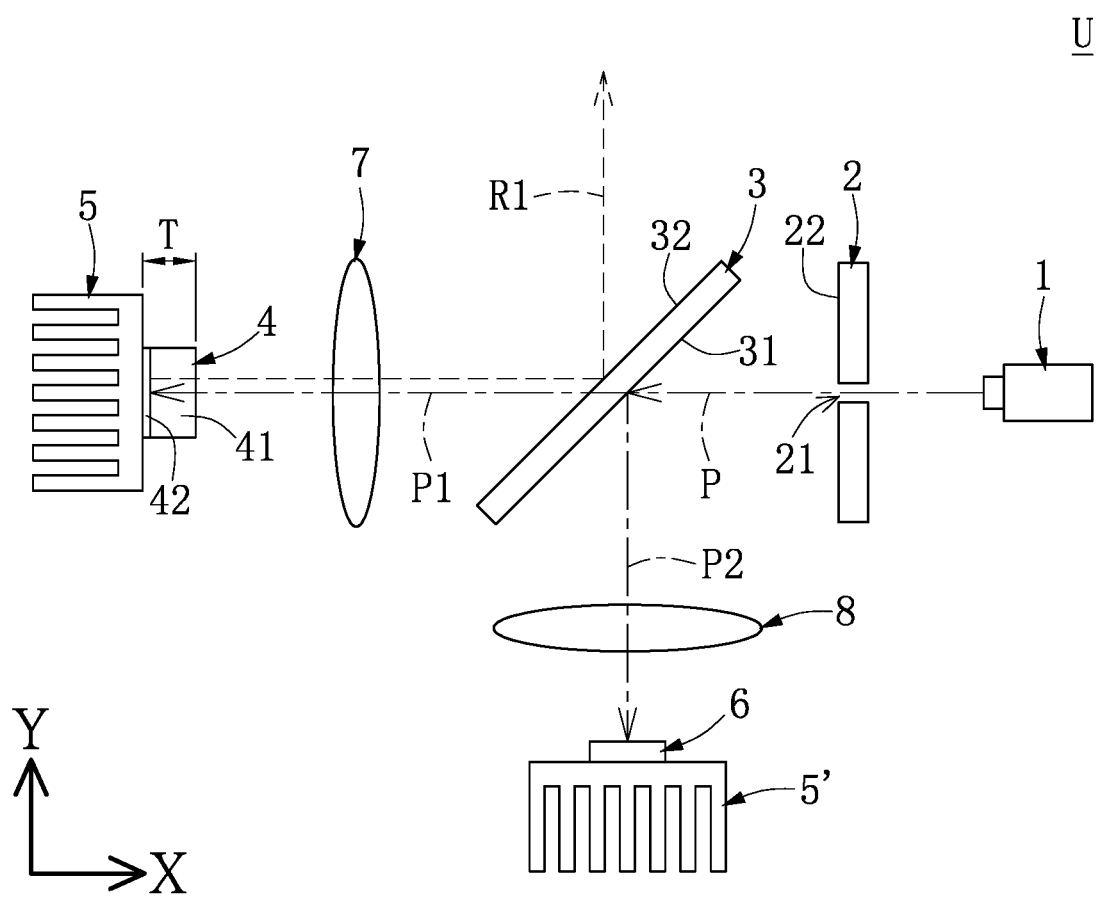
FIG. 1 is a schematic diagram of one optical path of a white light illumination system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Implementations of the "white light illumination system" disclosed in the present disclosure are described in the following through particular embodiments. Those skilled in the art may understand the advantages and effects of the present disclosure according to the content disclosed in this specification. The present disclosure may be implemented or applied through other different embodiments. Various modifications and alterations may be made on details in this specification based on different perspectives and applications without departing from the spirit of the present disclosure. In addition, it should be noted that the accompanying drawings in the present disclosure are merely a simple illustration, and are not drawn according to actual sizes. Technical content related to the present disclosure will be described in detail in the following implementations. However, the content disclosed is not intended to limit the technical scope of the present disclosure.

It should be appreciated that although terms such as first, second, and third may be used herein to describe various components, signals or the like, the components or signals are not limited by the terms. The terms are used for distinguishing one component from another component, or distinguishing one signal from another signal. In addition, as used herein, the term "or" may include, depending on an actual situation, any one of or all combinations of multiple of the associated items listed.

[Embodiment]

Figure 2:
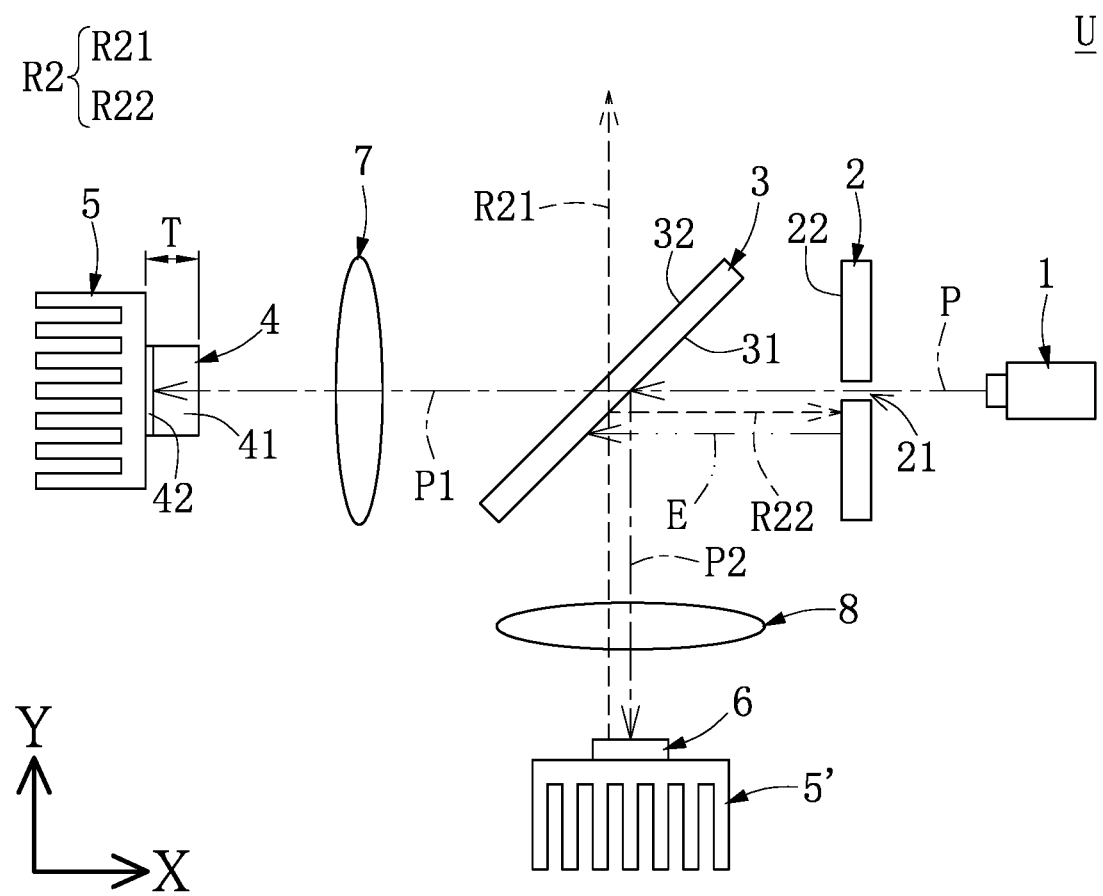
FIG. 2 is a schematic diagram of another optical path of a white light illumination system according to an embodiment of the present disclosure.

Firstly, referring to FIG. 1 and FIG. 2, FIG. 1 and FIG. 2 are each a schematic diagram of an optical path of a white light illumination system according to an embodiment of the present disclosure. A white light illumination system U provided by the present disclosure includes a light source unit 1, a reflective unit 2, a beam splitter unit 3, a phosphor unit 4, a diffuse reflective unit 6, a first lens unit 7, and a second lens unit 8. The light source unit 1 can generate an approximately collimated light beam P (as shown in FIG. 1) along a predetermined transmission path (negative X direction). However, it should be noted that, in other implementations, the first lens unit 7 and/or the second lens unit 8 may be selectively disposed depending on the circumstances, and there may be multiple first lens units 7 and/or second lens units 8, or adjustments to quantity according to requirements. In addition, for example, the light source unit 1 may be a laser module, and the approximately collimated light beam P generated by the laser module may be a blue laser. The blue laser may form a combined white light beam (as shown in FIG. 1 and FIG. 2, the combined white light beam includes a phosphor light beam R1 and a part of a diffused light beam R21) after being split by the beam splitter unit 3, excited and reflected by the phosphor unit 4, reflected by the diffuse reflective unit 6, and combined by the beam splitter unit 3.

However, it should be noted that, in other implementations, approximately collimated light beams of other colors may be generated by providing different laser modules, and beams of other colors may be excited by providing different phosphor units 4, thereby forming combined light beams of other colors. In addition, color temperature of the combined light beam may also be changed by providing different beam splitter units 3 or changing the concentration of the phosphor 41 of the phosphor unit 4. It should be noted that, the white light illumination system U provided by the present disclosure is preferably applied to a projector and used as a light source of the projector, but the present disclosure is not limited thereto. For example, the white light illumination system U provided by the present disclosure can also be applied to other high-power light source modules (for example, but not limited to, a high-power solid-state laser). For example, the white light illumination system U is applied to, but not limited to being applied to, a laser car lamp. In addition, when the white light illumination system U is applied to a laser car lamp, different light source units 1 or phosphor units 4 may be used to generate combined light beams of other colors.

Further, referring to FIG. 1 and FIG. 2, the reflective unit 2 may be disposed adjacent to one side of the light source unit 1, and the reflective unit 2 may be located on the predetermined transmission path of the approximately collimated light beam P. In addition, the reflective unit 2 may have a through hole 21 and a reflective surface 22, and the approximately collimated light beam P can pass through (penetrate) the through hole 21 along the predetermined transmission path. Preferably, the size of the through hole 21 may be slightly larger than or equal to the diameter of the approximately collimated light beam P. However, the present disclosure is not limited thereto.

Further, the beam splitter unit 3 may be disposed adjacent to one side of the light source unit 1, and the beam splitter unit 3 may be located on the predetermined transmission path of the approximately collimated light beam P. The approximately collimated light beam P generated by the light source unit 1 can pass through the through hole 21, to be projected to the beam splitter unit 3. For example, the beam splitter unit 3 may be an optical filter. In the embodiment of the present disclosure, 20% to 60% of the blue approximately collimated light beam P projected to the beam splitter unit 3 can penetrate the beam splitter unit 3, and 40% to 80% of the blue laser approximately collimated light beam P projected to the beam splitter unit 3 can be reflected by the beam splitter unit 3. In addition, it should be noted that, when the wavelength of the approximately collimated light beam is between 500 nm and 700 nm, more than 98% of the approximately collimated light beam P can be reflected by the beam splitter unit 3.

Next, referring to FIG. 1 and FIG. 2, the phosphor unit 4, the diffuse reflective unit 6, the first lens unit 7, and the second lens unit 8 may be disposed adjacent to one side of the light source unit 1. The first lens unit 7 may be disposed between the beam splitter unit 3 and the phosphor unit 4, and the second lens unit 8 may be disposed between the beam splitter unit 3 and the diffuse reflective unit 6. For example, the first lens unit 7 and the second lens unit 8 may each be a condensing lens (for example, but not limited to, a double convex lens) or a collimating lens. In addition, preferably, in the embodiment of the present disclosure, the white light illumination system U may further include a heat dissipation unit 5. The heat dissipation unit 5 may be disposed on the phosphor unit 4 to provide a heat dissipation function for the phosphor unit 4. For example, the heat dissipation unit 5 may be an aluminum extrusion heat dissipation structure, and the heat dissipation unit 5 may have a body portion (not marked in the figure), multiple extension portions (not marked in the figure) disposed on the body portion, and multiple groove portions (not marked in the figure) each disposed between two adjacent extension portions. In other words, the multiple extension portions disposed on the body portion may be heat dissipation fins of the heat dissipation unit 5. However, the present disclosure is not limited thereto. That is, in other implementations, the heat dissipation unit 5 may have only the body portion. It should be noted that, the thermal conductivity of the heat dissipation unit 5 may be preferably greater than 20 W/mK, but the present disclosure is not limited thereto.

Figure 3:
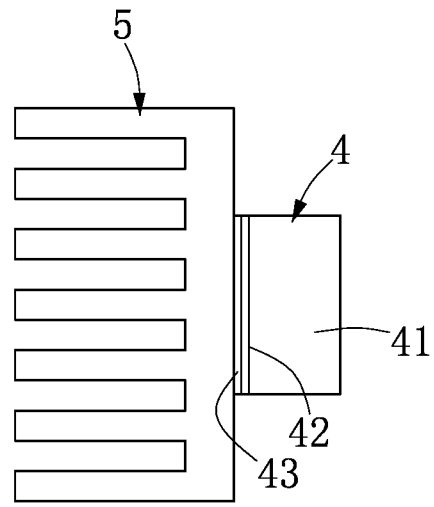
FIG. 3 is a schematic diagram of another phosphor unit according to an embodiment of the present disclosure.

Next, referring to FIG. 1 and FIG. 2 together with FIG. 3, where FIG. 3 is a schematic diagram of another phosphor unit according to another embodiment of the present disclosure, in the embodiment of the present disclosure, the phosphor unit 4 may include a phosphor 41 and a reflector 42 disposed on the phosphor 41, and the reflector 42 may be disposed between the heat dissipation unit 5 and the phosphor 41. In addition, in other implementations, the reflector 42 may also be disposed on the heat dissipation unit 5. For example, the reflector 42 may be disposed on the phosphor 41 or the heat dissipation unit 5 by means of coating or plating, but the present disclosure is not limited thereto. Furthermore, as shown in FIG. 3, in the embodiment of the present disclosure, a reflector having a good thermal conducting effect may be selected as the material of the reflector 42. For example, the material of the reflector 42 may be a material having a reflection effect, such as a reflective film (such as aluminum oxide, $Al_2O_3$), aluminum, silver, ceramic, silicon oxide ($SiO_2$), and titanium oxide ($TiO_2$).

Further, referring to FIG. 3, preferably, in other implementations, the phosphor unit 4 may further include a thermal conductor 43, and the thermal conductor 43 may be disposed between the heat dissipation unit 5 and the reflector 42. For example, the material of the thermal conductor 43 may be, for example, but not limited to, a thermal interface material such as a thermal conductive paste or a thermal conductive glue. In addition, one implementation of the present disclosure is to generate white light. Therefore, when the light beam generated by the light source unit 1 is a blue laser, the phosphor 41 may include yellow phosphor powder (not shown in the figure), and the phosphor 41 may be formed by the yellow phosphor powder mixed with ceramic, glass, silicone, or the like. In addition, a percent concentration by weight of the yellow phosphor powder in the phosphor 41 is in a range from 15% to 70%. Therefore, the blue laser can be excited by the phosphor 41 to produce yellow light. It should be noted that, the phosphor unit 4 may have a predetermined thickness T ranging from 0.1 millimeter (mm) to 0.3 mm, but the present disclosure is not limited thereto.

Further, referring to FIG. 1 and FIG. 2, it should be noted that, another heat dissipation unit 5' disposed on the diffuse reflective unit 6 may further be provided, to provide a heat dissipation function for the diffuse reflective unit 6. However, it should be noted that, whether or not a heat dissipation unit 5' is disposed on the diffuse reflective unit 6 is not limited in the present disclosure. Moreover, it should be noted that, in other implementations, the light source unit 1, the reflective unit 2, the beam splitter unit 3, the phosphor unit 4, the heat dissipation unit 5, the heat dissipation unit 5', the diffuse reflective unit 6, the first lens unit 7, and the second lens unit 8 may be disposed on a carrier base (not shown in the figure). For example, the carrier base may be a housing of the projector, or a frame in the housing of the projector, to carry various components in the white light illumination system U provided in the embodiment of the present disclosure, but the present disclosure is not limited thereto. In the embodiment of the present disclosure, the diffuse reflective unit 6 is used for converting the blue laser into diffused blue light. Therefore, the reflectivity of the diffuse reflective unit 6 may be greater than 85%. For example, the diffuse reflective unit 6 may be an aluminum oxide plate or a matte aluminum reflective plate, and preferably may be an aluminum oxide plate. In addition, the distribution of diffusion angles generated by the diffuse reflective unit 6 satisfies the following relation: $l(\theta, n)=(\cos\theta)^n$, where n>0.8, and 0°<θ<180°. Further, in one embodiment, n may be between 0.8 and 1.2.

Figure 4:
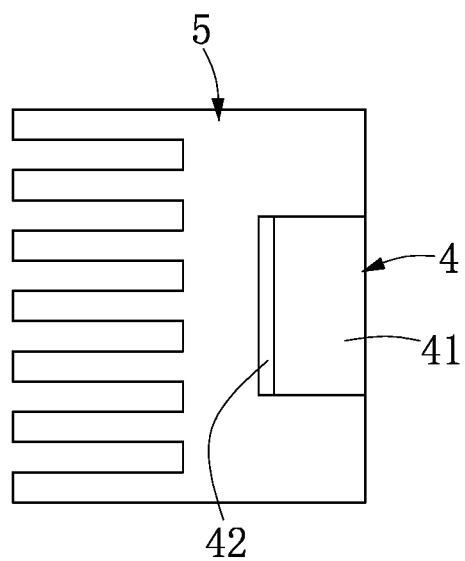
FIG. 4 is a schematic diagram of another arrangement manner of a phosphor unit and a heat dissipation unit according to an embodiment of the present disclosure.

Further, referring to FIG. 1 and FIG. 2 together with FIG. 4, it should be noted that, in other implementations, the phosphor unit 4 may also be embedded (or inlaid) in the heat dissipation unit 5, so that the overall volume of the phosphor unit 4 and the heat dissipation unit 5 can be further reduced, while the reflection effect and heat dissipation efficiency of the phosphor unit 4 can be further improved.

Next, referring to FIG. 1 and FIG. 2, an optical path of the approximately collimated light beam P in the white light illumination system U of the present disclosure is further described in the following. The approximately collimated light beam P can be split by the beam splitter unit 3 to form first approximately collimated light P1 and second approximately collimated light P2 that are projected to the phosphor unit 4 and the diffuse reflective unit 6, respectively. The first approximately collimated light P1 and the second approximately collimated light P2 can be projected to the beam splitter unit 3 after being reflected by the phosphor unit 4 and the diffuse reflective unit 6, respectively, to form a combined white light beam. It should be noted that, for easy understanding of the figures, FIG. 1 mainly illustrates the optical path of the first approximately collimated light P1, and FIG. 2 mainly illustrates the optical path of the second approximately collimated light P2.

Further, referring to FIG. 1 and FIG. 2, to be specific, the beam splitter unit 3 may include a first surface 31 and a second surface 32 opposite to the first surface 31. 20% to 60% of the approximately collimated light beam P projected to the beam splitter unit 3 can penetrate the first surface 31 and the second surface 32 of the beam splitter unit 3, and 40% to 80% of the laser approximately collimated light beam P projected to the beam splitter unit 3 can be reflected by the first surface 31 of the beam splitter unit 3. The approximately collimated light beam P can be split by the beam splitter unit 3, to form the first approximately collimated light P1 that penetrates the beam splitter unit 3, and form the second approximately collimated light P2 that is reflected by the beam splitter unit 3. The first approximately collimated light P1 can be sequentially projected to the first lens unit 7 and the phosphor unit 4, and the second approximately collimated light P2 can be sequentially projected to the second lens unit 8 and the diffuse reflective unit 6. For example, the beam splitter unit may be a dielectric multilayer film, but the present disclosure is not limited thereto.

In other words, 20% to 60% of the approximately collimated light beam P projected to the beam splitter unit 3 can penetrate the first surface 31 and the second surface 32 of the beam splitter unit 3, to form the first approximately collimated light P1 projected to the first lens unit 7 and the phosphor unit 4. 40% to 80% of the laser approximately collimated light beam P projected to the beam splitter unit 3 can be reflected by the first surface 31 of the beam splitter unit 3, to form the second approximately collimated light P2 projected to the second lens unit 8 and the diffuse reflective unit 6.

Further, referring to FIG. 1, the first approximately collimated light P1 can be excited and reflected by the phosphor unit 4, to form a phosphor light beam R1 that is projected by the first lens unit 7 to the beam splitter unit 3 and reflected by the beam splitter unit 3. To be specific, the first approximately collimated light beam P first can be projected by the first lens unit 7 to the phosphor 41 of the phosphor unit 4, and then can be reflected by the reflector 42 of the phosphor unit 4 to be projected to the first lens unit 7. It should be noted that, the light beam formed after the approximately collimated light beam P is excited by the phosphor 41 is fluorescent diffused light. In addition, by disposing the first lens unit 7, the phosphor light beam R1 can still be projected as an approximately collimated light beam to the beam splitter unit 3, and is reflected by the second surface 32 of the beam splitter unit 3. It should be noted that, to facilitate understanding of the figures, the phosphor light beam R1 is replaced with a line therein.

Further, referring to FIG. 2, the second approximately collimated light P2 can be reflected by the diffuse reflective unit 6, to form a diffused light beam R2 that is projected by the second lens unit 8 to the beam splitter unit 3 and penetrates the beam splitter unit 3. To be specific, the second approximately collimated light P2 first can be projected by the second lens unit 8 to the diffuse reflective unit 6, and then can be reflected by the diffuse reflective unit 6, to be projected to the second lens unit 8. It should be noted that, the light beam formed after the second approximately collimated light P2 is reflected by the diffuse reflective unit 6, is diffused light. By disposing the second lens unit 8, the diffused light beam R2 can still be projected as an approximately collimated light beam to the beam splitter unit 3 and can penetrate the beam splitter unit 3. Therefore, as shown in FIG. 1 and FIG. 2, the phosphor light beam R1 and the diffused light beam R21 can be superimposed with each other to form the combined white light beam. It should be noted that, to facilitate understanding of the figures, the diffused light beam R2 (a part of the diffused light beam R21 and another part of the diffused light beam R22) is replaced with a line therein.

Further, referring to FIG. 2, due to the characteristics of the beam splitter unit 3, a part of the diffused light beam R21 can penetrate the first surface 31 and the second surface 32 of the beam splitter unit 3, to be superimposed with the phosphor light beam R1 to form the combined white light beam. Another part of the diffused light beam R22 can be reflected by the first surface 31 of the beam splitter unit 3, to be projected to the reflective surface 22 of the reflective unit 2. Next, another part of the diffused light beam R22 can be reflected by the reflective surface 22 of the reflective unit 2, to form a reuse light beam E to be projected to the first surface 31 of the beam splitter unit 3 again, so that light is recycled. Therefore, the path of the reuse light beam E is similar to that in the foregoing description of the approximately collimated light beam P, and the reuse light beam E can be superimposed with the foregoing combined white light beam again after being split by the beam splitter unit 3, excited and reflected by the phosphor unit 4, reflected by the diffuse reflective unit 6, and combined by the beam splitter unit 3.

[Beneficial Effects of the Embodiment]

One of the beneficial effects of the present disclosure is that, the white light illumination system provided by the embodiment of the present disclosure can be applied to high-power light source module architecture by the technical solutions of "the approximately collimated light beam P can be split by the beam splitter unit 3, to form first approximately collimated light P1 and second approximately collimated light P2 that can be projected to the phosphor unit 4 and the diffuse reflective unit 6, respectively" and that "the first approximately collimated light P1 and the second approximately collimated light P2 are projected to the beam splitter unit 3 after being reflected by the phosphor unit 4 and the diffuse reflective unit 6, respectively, to form a combined white light beam".

Furthermore, because the present disclosure adopts a reflective architecture, a heat dissipation unit 5 can further be disposed behind the phosphor unit 4, thereby improving the heat dissipation efficiency, so that the present disclosure can be applied to a high-power light source module. Moreover, by using the blue diffused light provided by the diffuse reflective unit 6, the need for a light emitting diode that generates blue light to be provided in the existing technology can be omitted, thereby reducing the cost. In addition, by using the reflective surface 22 of the reflective unit 2, a reuse light beam E can be generated, so that the reuse rate of the light beam is further improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A white light illumination system, comprising:
   a light source unit, the light source unit being capable of generating an approximately collimated light beam along a predetermined transmission path;
   a beam splitter unit disposed adjacent to one side of the light source unit and located on the predetermined transmission path, wherein the approximately collimated light beam can be projected to the beam splitter unit;
   a phosphor unit disposed adjacent to one side of the light source unit and including a phosphor and a reflector disposed on the phosphor;
   a heat dissipation unit disposed on the phosphor unit, the reflector being disposed between the heat dissipation unit and the phosphor;
   a diffuse reflective unit disposed adjacent to one side of the light source unit;
   a first lens unit disposed between the beam splitter unit and the phosphor unit
   a second lens unit disposed between the beam splitter unit and the diffuse reflective unit and
   a reflective unit disposed adjacent to one side of the light source unit, the reflective unit having a through hole;
   wherein the approximately collimated light beam is projected to the beam splitter unit through the through hole;
   wherein the approximately collimated light beam is split by the beam splitter unit, to form a first approximately collimated light that penetrates the beam splitter unit and is sequentially projected to the first lens unit and the phosphor unit and a second approximately collimated light that is reflected by the beam splitter unit and is sequentially projected to the second lens unit and the diffuse reflective unit;

wherein the first approximately collimated light and the second approximately collimated light are projected to the beam splitter unit after being reflected by the phosphor unit and the diffuse reflective unit, respectively, to form a combined white light beam;

wherein the first approximately collimated light is reflected by the phosphor unit, to form a phosphor light beam that is projected to the beam splitter unit by the first lens unit and reflected by the beam splitter unit;

wherein the second approximately collimated light is reflected by the diffuse reflective unit, to form a diffused light beam that is projected to the beam splitter unit by the second lens unit and penetrates the beam splitter unit;

wherein the phosphor light beam and the diffused light beam can form the combined white light beam after being superimposed with each other.

2. The white light illumination system according to claim 1, wherein a part of the diffused light beam penetrates the beam splitter unit, and another part of the diffused light beam can be reflected by the beam splitter unit, to be projected to the reflective unit.

3. The white light illumination system according to claim 2, wherein another part of the diffused light beam is reflected by the reflective unit to be projected to the beam splitter unit.

4. The white light illumination system according to claim 1, wherein 20% to 60% of the approximately collimated light beam projected to the beam splitter unit penetrates the beam splitter unit, and 40% to 80% of the approximately collimated light beam projected to the beam splitter unit is reflected by the beam splitter unit.

5. The white light illumination system according to claim 1, wherein the approximately collimated light beam is a blue laser.

6. The white light illumination system according to claim 5, wherein the phosphor includes yellow phosphor powder, and a percent concentration by weight of the yellow phosphor powder in the phosphor is in a range from 15% to 70%.

7. The white light illumination system according to claim 1, wherein the phosphor includes yellow phosphor powder, and a percent concentration by weight of the yellow phosphor powder in the phosphor is in a range from 15% to 70%.

8. The white light illumination system according to claim 1, wherein the phosphor unit further includes a thermal conductor, and the thermal conductor is disposed between the heat dissipation unit and the reflector.

9. The white light illumination system according to claim 1, wherein the diffuse reflective unit has a reflectivity greater than 85%.

* * * * *